United States Patent
Suzuki et al.

(10) Patent No.: US 7,912,253 B2
(45) Date of Patent: Mar. 22, 2011

(54) OBJECT RECOGNITION METHOD AND APPARATUS THEREFOR

(75) Inventors: Takashi Suzuki, Yokohama (JP);
Katsuhiko Mori, Kawasaki (JP);
Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1106 days.

(21) Appl. No.: 11/630,031

(22) PCT Filed: Jun. 27, 2005

(86) PCT No.: PCT/JP2005/012258
§ 371 (c)(1),
(2), (4) Date: Dec. 19, 2006

(87) PCT Pub. No.: WO2006/001525
PCT Pub. Date: Jan. 5, 2006

(65) Prior Publication Data
US 2007/0242856 A1 Oct. 18, 2007

(30) Foreign Application Priority Data
Jun. 28, 2004 (JP) ................................. 2004-190306

(51) Int. Cl.
*G06K 9/00* (2006.01)
(52) U.S. Cl. .................... 382/118; 382/195; 382/218
(58) Field of Classification Search .................. 382/103, 382/118, 156, 159, 195, 218
See application file for complete search history.

(56) References Cited

U.S. PATENT DOCUMENTS

| | | | |
|---|---|---|---|
| 5,164,992 A | 11/1992 | Turk et al. | 382/2 |
| 5,920,644 A * | 7/1999 | Fujimoto et al. | 382/159 |
| 6,173,066 B1 * | 1/2001 | Peurach et al. | 382/103 |
| 6,356,659 B1 | 3/2002 | Wiskott et al. | 382/209 |
| 7,039,233 B2 | 5/2006 | Mori et al. | 382/181 |
| 7,054,850 B2 | 5/2006 | Matsugu | 706/48 |
| 2002/0181775 A1 | 12/2002 | Matsugu | 382/195 |
| 2003/0044073 A1 | 3/2003 | Matsugu et al. | 382/195 |
| 2006/0074653 A1 | 4/2006 | Mitari et al. | 704/240 |
| 2006/0115157 A1 | 6/2006 | Mori et al. | 382/190 |
| 2006/0204053 A1 | 9/2006 | Mori et al. | 382/118 |
| 2006/0228005 A1 | 10/2006 | Matsugu et al. | 382/116 |

FOREIGN PATENT DOCUMENTS

| | | |
|---|---|---|
| CN | 1352436 A | 6/2002 |
| EP | 1 262 908 A1 | 12/2002 |
| JP | 2002288670 A | 10/2002 |
| JP | 2002358500 A | 12/2002 |
| JP | 2003346152 A | 12/2003 |

OTHER PUBLICATIONS

Office Action, dated Jan. 9, 2009, in CN 2005800216170.

(Continued)

*Primary Examiner* — Andrew W Johns
(74) *Attorney, Agent, or Firm* — Fitzpatrick, Cella, Harper & Scinto

(57) ABSTRACT

A feature extraction unit (23) extracts features of an object of interest included in an image. A local region setting unit (24) sets a local region that includes a feature group required to obtain the shape of the object and a local region that includes a feature group required to obtain the positional relationship. A feature vector generation unit (25) calculates feature vector data in the set local regions. An object recognition unit (26) determines which of different objects the object of interest is, on the basis of the feature vectors.

10 Claims, 13 Drawing Sheets

OTHER PUBLICATIONS

JP Refusal, dated Jun. 13, 2008, in JP 2004-190306.

Hagiwara, Eiichi et al., "Facial Image Identification Based on Pattern Matching", IEICE Technical Report, vol. 88, No. 112, Jul. 15, 2008.

Chang, Chih-Chung et al., LIBSVM: a Library for Support Vector Machines, 2001, http://www.csie.ntu.edu.tw/~cjlin/libsvm.

European Office Action dated Jun. 30, 2009 in European Counterpart Application No. 05765449.3.

"Face Recognition with Support Vector Machines: Global versus Component-based Approach" by B. Heisele, et al. dated Jul. 7, 2001.

Kim et al., "Component-based LDA Face Descriptor for Image Retrieval", Proceedings of the 13th British Machine Vision Conference, vol. 2 on Sep. 2-5, 2002 at Cardiff University.

"Face Detection in Still Gray Images" by B. Heisele, et al. dated May 1, 2000.

Matsugu et al., "Convolutional Spiking Neural Network Model for Robust Face Detection", Proceedings 9th Int'l Conf. on Neural Info. Proc. (ICONIP'02), vol. 2, pp. 660-664.

* cited by examiner

OBJECT RECOGNITION METHOD AND APPARATUS THEREFOR

TECHNICAL FIELD

The present invention relates to a technique for recognizing an object included in an image.

BACKGROUND ART

In order to explain the prior art of object recognition in this section, face personal recognition by recognizing the acquired face image will be taken as an example. In general, there are two approaches to face recognition using a face image.

The first approach is a pattern matching method which captures a face as an image pattern expressed by two-dimensional arrays of density values of respective pixels, and performs recognition by matching image patterns. As a typical example of the pattern matching method, an eigenface method using PCA (Principal Component Analysis) (e.g., see U.S. Pat. No. 5,164,992) is taken, and the basic framework of the eigenface method will be described below.

The eigenface method applies PCA to the intensity value patterns of a large number of face images to obtain an orthonormal basis called an eigenface. Using the orthonormal basis, KL (Karhunen Loeve) expansion is applied to the intensity pattern of an arbitrary face image to obtain dimensionally compressed vectors of the pattern Finally, using the vectors as feature vectors for recognition, recognition is made by a statistical process between the feature vectors of an input pattern and registered patterns, which are registered in advance. The basic framework of the eigenface method has been described. This PCA based scheme must obtain an eigenface (average face) from a large number of face images in advance, and illumination variations and spatial layout variations of face images used to generate an eigenface influence the precision.

As the second approach, a feature-based method that performs recognition by matching feature vectors which numerically express the shapes of features and their spatial layout relationship by extracting feature points indicating features such as eyes, mouth, and nose of a face. As a typical example of the feature-based method, a scheme based on the Dynamic link architecture (e.g., see U.S. Pat. No. 6,356,659) is taken, and the basic framework of the scheme will be explained below.

In this scheme, a Gabor filter which extracts the periodicity and directionality of texture from a large number of sampling points (e.g., the eyes, mouth, nose, and outline of the face) set on a face pattern is applied to obtain local texture information as feature vectors. A graph which associates sampling points with nodes is calculated, and is built by applying feature vectors as the spatial layout information of the sampling points and attribute values of the nodes corresponding to the sampling points. The recognition process is implemented by elastically deforming the spatial layout information among nodes between an input pattern and the graphs of registered patterns which are registered in advance, and selecting a registered pattern with highest similarity (Dynamic graph matching). The basic framework of the scheme based on the Dynamic link architecture has been described.

However, since the scheme based on the Dynamic link architecture requires complicated numerical calculations in calculation of the attribute values at the sampling points and the processing of Dynamic graph matching, the operation cost increases depending on the courses of these processes.

DISCLOSURE OF INVENTION

The present invention has been made in consideration of the aforementioned problems, and has as its object to provide a technique for simply making individual identification of an object.

In order to achieve an object of the present invention, for example, an image processing method of the present invention comprises the following arrangement.

That is, an image processing method for executing a process for identifying an object included in an image, characterized by comprising:

a detection step of detecting features in an object of interest included in the image;

a setting step of setting local regions which include feature groups required to obtain a shape and positional relationship of the object, of the features detected in the detection step; and a determining step of determining which of different individuals the object of interest is, on the basis of the feature groups in the local regions set in the setting step for the object of interest.

In order to achieve an object of the present invention, for example, an image processing apparatus of the present invention comprises the following arrangement.

That is, an image processing apparatus for executing a process for individually identifying an object included in an image, characterized by comprising:

detection means for detecting features in an object of interest included in the image;

setting means for setting local regions which include feature groups required to obtain a shape and positional relationship of the object, of the features detected by the detection means; and determining means for determining which of different individuals the object of interest is, on the basis of the feature groups in the local regions set by the setting means for the object of interest.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will now be described in detail in accordance with the accompanying drawings.

First Embodiment

This embodiment will explain a technique which extracts an object included in an image, generates high-order feature vectors for recognition including shape information and spatial layout information on the basis of feature points of features of the object, and matches the high-order feature vectors with a model database generated by a learning algorithm to identify the object.

Figure 2:
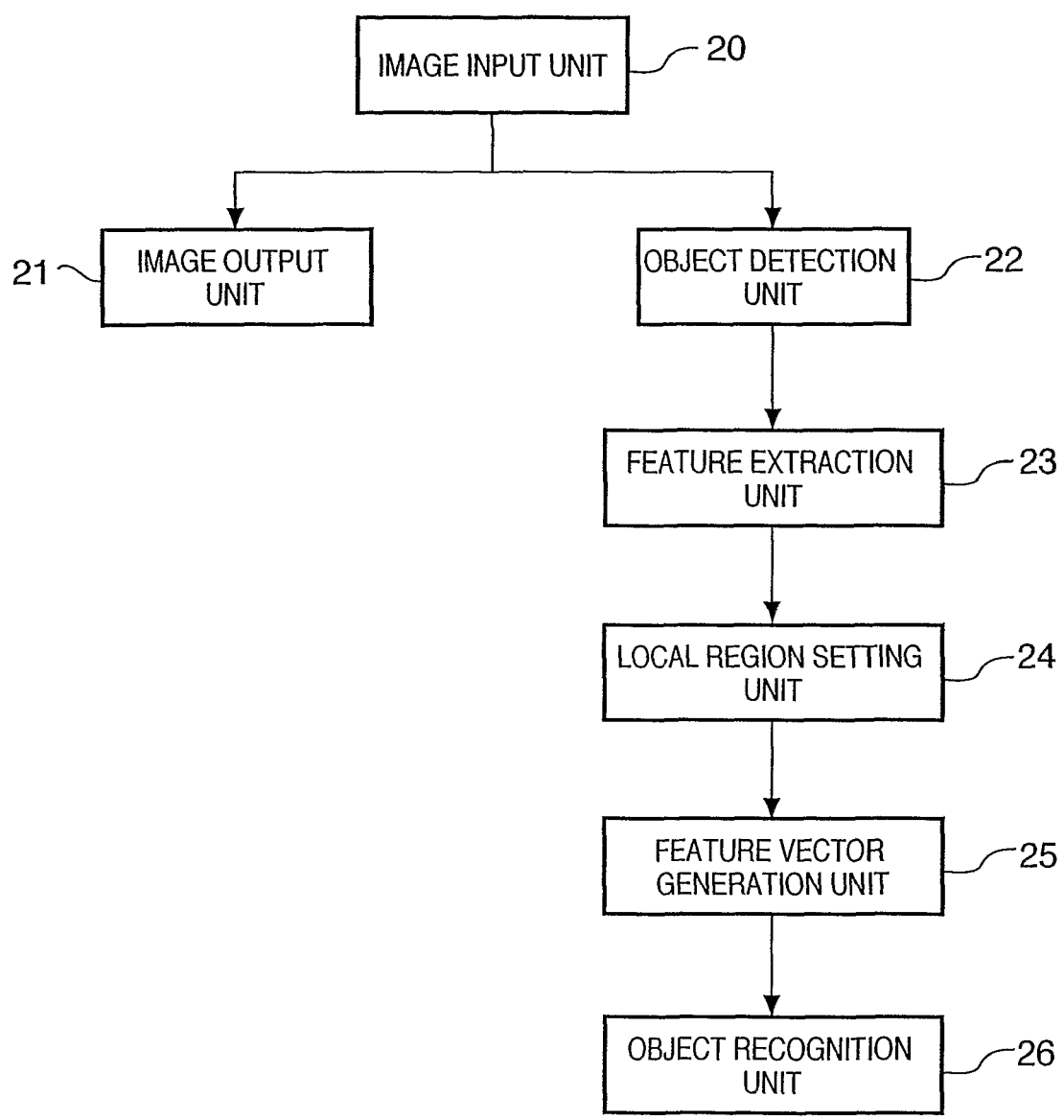
FIG. 2 is a block diagram showing the basic arrangement of an image processing apparatus according to the first embodiment of the present invention.

FIG. 2 is a block diagram showing the functional arrangement of an image processing apparatus according to this embodiment. As shown in FIG. 2, assume that the image processing apparatus according to this embodiment is applied to an image sensing apparatus which comprises an image input unit 20, image output unit 21, object detection unit 22, feature extraction unit 23, local region setting unit 24, feature vector generation unit 25, and object recognition unit 26. In this embodiment, these units are implemented by hardware. However, these units may be stored in a ROM of the image sensing apparatus in the form of programs, and a CPU of the image sensing apparatus may execute these programs.

An image signal sensed by an image sensing system (not shown) which comprises a lens and an image sensing element such as a CCD, CMOS, or the like is input to the image input unit 20.

The image input unit 20 corrects the image signal from the image sensing system by known correction processes such as white balance correction and the like, and outputs the corrected image signal to the image output unit 21 and object detection unit 22.

The image output unit 21 outputs the image signal from the image input unit 20 to a display device (not shown) such as a CRT, liquid crystal display, or the like. In this way, an image based on the image signal sensed by the image sensing system is displayed on the display screen of this display device.

The object detection unit 22 comprises a dedicated chip such as a neuro chip that imitates a human neural circuit, or a general-purpose chip such as FPGA, ASIC, or the like. The object detection unit 22 detects an object included in the image from the image input unit 20.

The feature extraction unit 23 comprises a dedicated chip such as a neuro chip that imitates a human neural circuit, or a general-purpose chip such as FPGA, ASIC, or the like as in the object detection unit 22. The feature extraction unit 23 has a function of extracting features of the object detected by the object detection unit 22.

The local region setting unit 24 comprises a dedicated image processing processor or general-purpose processor, and executes a process for setting regions around the features extracted by the feature extraction unit 23.

The feature vector generation unit 25 comprises a dedicated image processing processor or general-purpose processor, and generates feature vectors within the regions set by the local region setting unit 24.

The object recognition unit 26 comprises simple circuits such as a product sum operation circuit, comparator, and the like. The object recognition unit 26 has a function of calculating a product sum value to have the feature vectors generated by the feature vector generation unit 25 as input values, and comparing it with a database held by itself.

The processing to be executed by the image sensing apparatus with the above arrangement, i.e., the processing for identifying the face of a person included in an image sensed by this image sensing apparatus will be described below.

Figure 3:
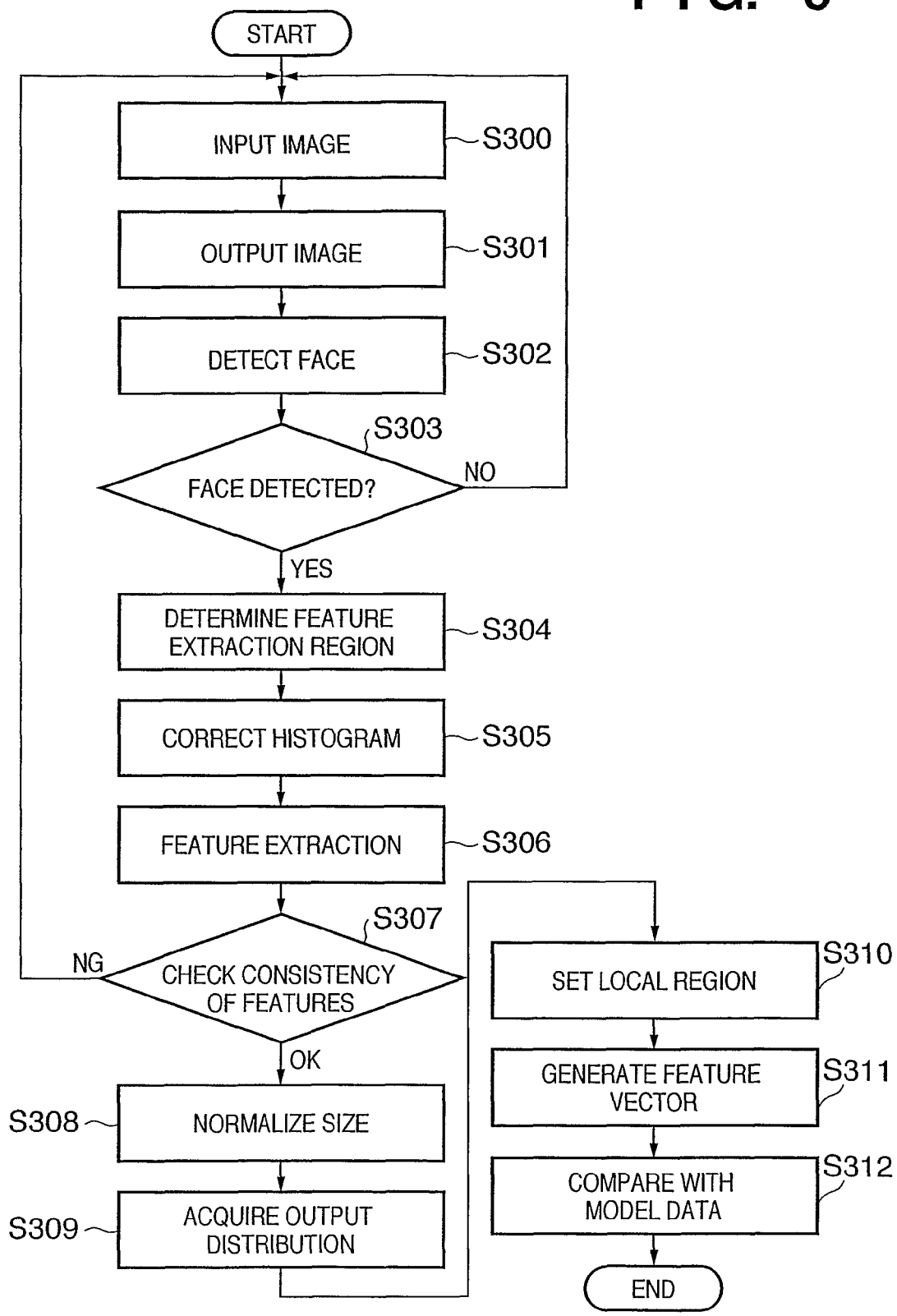
FIG. 3 is a flowchart of the processing for identifying the face of a person included in a sensed image.

FIG. 3 is a flowchart of the processing for identifying the face of a person included in the sensed image.

In step S300, an image including a face of an object to be identified is input by the image input unit 20. In step S301, this image is output to the image output unit 21 and object detection unit 22. As a result, since the image output unit 21 corrects this image and outputs the corrected image to the display device (not shown), the image input from the image output unit 21 is displayed on the display screen of this display device.

In step S302, a process for detecting a face of the person to be identified from the image input from the image input unit 20 by the object detection unit 22 is executed. As a detection method, the user may directly designate a face region on the display screen by operations of buttons (not shown) equipped in the image sensing apparatus or those on the display screen of a touch panel type, or a known template matching technique using a filter such as a face detection template or the like may be used.

In this embodiment, face detection is made using a neural network based face detection technique. The neural network based face detection technique executed in step S302 will be described below. Note that this technique is known to those who are skilled in the art, so please refer to M. Matsugu, K. Mori, et. al, "Convolutional Spiking Neural Network Model for Robust Face Detection", 2002, International Conference On Neural Information Processing (ICONIP02).

Figure 4:
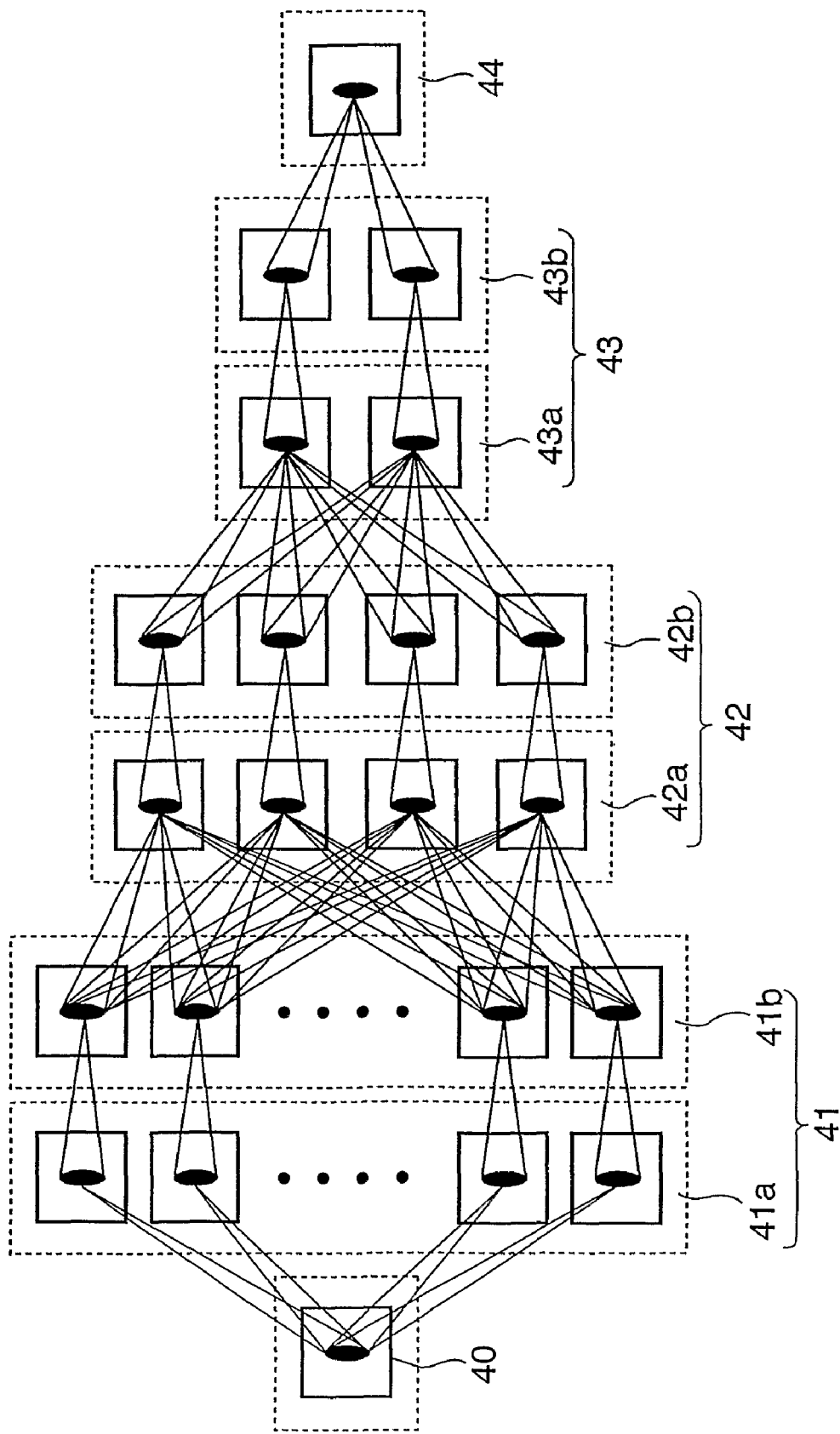
FIG. 4 is a view showing the configuration of a neural network used in the first embodiment of the present invention.

FIG. 4 is a view showing the configuration of this network. As shown in FIG. 4, this neural network is a hierarchical neural network, and comprises a configuration used to sequentially recognize high-order features from low-order features.

Reference numeral 40 denotes an image (input image) from the image input unit 20. Reference numeral 41 denotes a first layer (level), which includes a detection layer 41a and integration layer 41b. Reference numeral 42 denotes a second level, which includes a detection layer 42a and integration layer 42b. Reference numeral 43 denotes a third level, which includes a detection layer 43a and integration layer 43b. Reference numeral 44 denotes a fourth level.

In the first level 41, the detection layer 41a extracts primitive features from the input image 40, and the integration layer 41b integrates these primitive features. The integration results are input to the detection layer 42a in the second level 42, which detects higher-order features. The integration layer 42b executes a process for integrating features detected by the detection layer 42*a* as in the integration layer 41*b* in the first level. Likewise, the detection layer 43*a* of the third level 43 detects higher-order features using the integration results by the integration layer 42*b* in the second level 42. The integration layer 43*b* executes a process for integrating features detected by the detection layer 43*a* as in the integration layer 42*b* in the second level. Finally, the fourth level 44 detects a face using the integration results of the integration layer 43*b* of the third level 43.

Features to be detected will be described below using FIGS. 5A to 5H. FIGS. 5A to 5H show features to be extracted from a human face in an image.

In this embodiment, upon execution of the face detection process, neuron's firing distributions are acquired near features of the inner and outer canthi of two eyes, the two ends of a mouth, the eyes, and the mouth. These acquired distributions will be referred to as intermediate output distributions or detection output distributions.

The first level 41 is used to detect features having feature information of a face, and in this embodiment, both the detection layer 41*a* and integration layer 41*b* have eight, i.e., first to eighth detection modules. For example, the first level may have a detection level to the extent of a change in luminance or extraction of line segment directions.

Figure 5E:
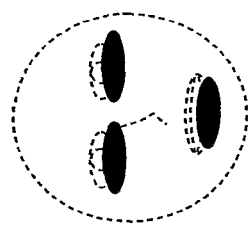
FIGS. 5A-5H show features to be extracted from a human face in an image.
Figure 5D:
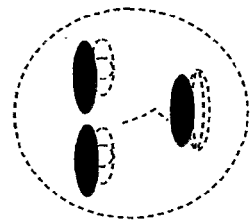
Figure 5C:
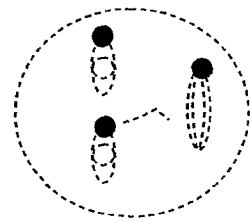
Figure 5B:
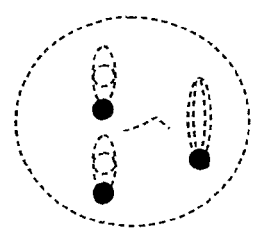

Next, the second level 42 outputs output distributions such as a detection output distribution indicating a right-open V-shaped edge feature indicated by black dots in FIG. 5B, a detection output distribution indicating a left-open V-shaped edge feature indicated by black dots in FIG. 5C, a detection output distribution indicating a line segment edge 1 feature indicated by black dots in FIG. 5D, and a detection output distribution indicating a line segment edge 2 feature indicated by black dots in FIG. 5E.

The detection output distribution indicating the right-open V-shaped edge feature represents the detection results of the outer canthus of the left eye, the inner canthus of the right eye, and the left end of the mouth, as shown in FIG. 5B. The detection output distribution indicating the left-open V-shaped edge feature represents the detection results of the outer canthus of the right eye, the inner canthus of the left eye, and the right end of the mouth, as shown in FIG. 5C. In this way, the V-shaped edge features are effective to detect left and right end features 507 and 508 of the mouth, outer canthus features 509 and 510 of the two eyes, and inner canthus features 511 and 512 of the two eyes, as shown in FIG. 5A.

Figure 5G:
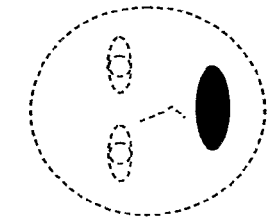
Figure 5F:
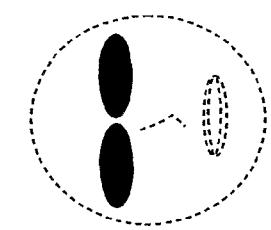
Figure 5H:
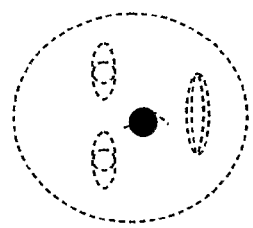
Figure 5A:
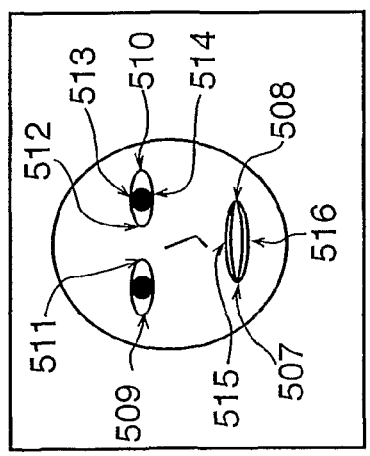

Also, the line segment edge 1 feature and line segment edge 2 feature are effective to detect upper and lower eyelids 513 and 514 of the eyes, and upper and lower lips 515 and 516, as shown in FIG. 5A.

The third level 43 outputs eye detection output distributions 504 indicated by black dots in FIG. 5F, and a mouth detection output distribution 505 indicated by a black dot in FIG. 5G upon reception of the feature detection results of the second level 42.

Finally, the fourth level 44 outputs a face detection output distribution 506 indicated by a black dot in FIG. 5H on the basis of the eye and mouth detection results of the third level 43.

In this manner, the higher levels (those on the right side in FIG. 4) execute processes for detecting rougher features by integrating those detected by the lower levels. As described above, since the feature detection using such hierarchical neural network is a state-of-the technique, no more explanations will be avoided.

Referring back to FIG. 3, the object detection unit 22 checks in step S303 if a face region exists in the image from the image input unit 20. This checking process is attained by determining if, for example, the neuron's firing distributions have a predetermined value or more. In addition, if a neuron set having outputs equal to or higher than a predetermined value exists in a neuron group which forms the fourth level, it may be determined that a "face is detected".

In step S304, the feature extraction unit 23 determines the spatial layout of the features (e.g., eyes and mouth) within the face region by calculating the barycentric positions on the basis of the intermediate neuron detection output distribution in step S302. In this manner, the improvement of the feature retrieval precision and extraction speed can be expected.

Note that the detection output distribution has the same size as that of the input image, and individual neurons which form detection modules correspond to pixels which form the input image. Therefore, when the barycentric position of a neuron group (i.e., a neuron group whose output value is equal to or higher than a predetermined value) that detects a predetermined feature in the neurons in the detection modules is calculated, the position of this predetermined feature in the input image can be obtained.

In this embodiment, by calculating the barycentric positions of the neuron groups which detect the eyes and mouth in step S302, the positions of the eyes and mouth (spatial layout) in the face region are obtained. Then, regions each having an arbitrary size are set around the obtained positions (the positions of the eyes and mouth), and are defined as feature retrieval ranges. This size suffices to be that which includes a feature to be extracted.

In step S305, the feature extraction unit 23 makes histogram correction of the input image for the purpose of improving the feature extraction precision. As a histogram correction method, a known image processing technique may be used. In this embodiment, histogram correction is attained by linearly interpolating a luminance value range from "20" to "150" of G channel of the input image, and setting luminance values of 20 or less to a luminance value "0" and luminance values of 150 or more to a luminance value "255". Note that the histogram correction process in step S305 is not indispensable.

In step S306, the feature extraction unit 23 applies feature extraction of face features to the retrieval ranges set in step S304. As an extraction method, the user may directly designate face features on the display screen by operations of buttons (not shown) equipped in the image sensing apparatus or those on the display screen of a touch panel type, or a known template matching technique using a filter such as a face detection template or the like may be used. In this embodiment, the neural network-based technique which has learned to detect features from the eye and mouth regions is used, and the barycentric positions of the output distributions of neurons are calculated, thereby detecting left and right end features of the mouth, and outer and inner canthus features of the two eyes shown in FIGS. 5A to 5H. As for the coordinate calculations, as in the description in step S302, the barycentric position of a neuron group that detects a predetermined feature (i.e., a neuron group whose output value is equal to or higher than a predetermined value) of neurons in the detection modules is calculated, thus obtaining the position of this predetermined feature in the input image.

In step S307, the feature extraction unit 23 checks the layout relationship of the features extracted in step S306. That is, the unit 23 checks whether or not the extracted feature coordinates are inappropriate upon describing the object. As a practical example, in this embodiment, if the feature coordinates of the inner and outer canthi are lower than the center of the face region extracted in step S304, it is determined that the feature extraction results are not sufficient. If an upside-down face image input is allowed, the present invention is not limited by this condition. Such condition depends on the use scene of the system, but a feature consistency check unit having given conditions is indispensable.

Figure 6:
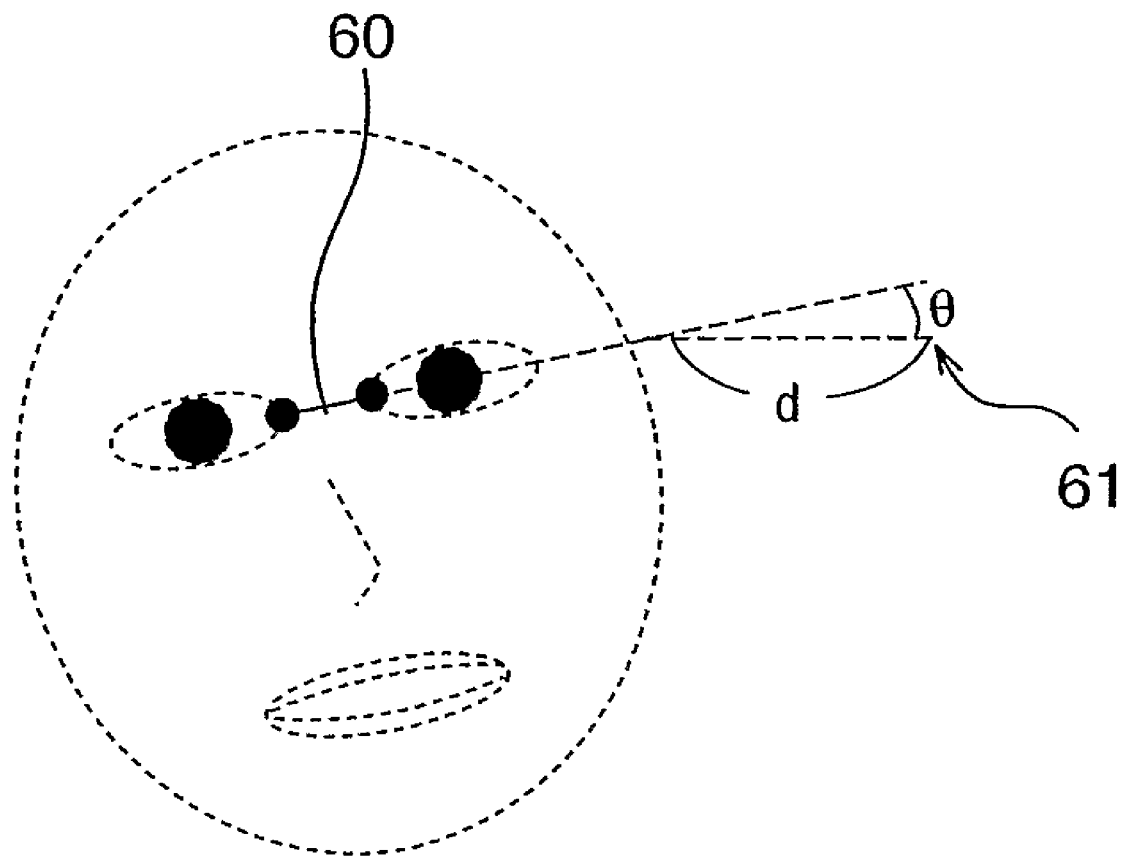
FIG. 6 is a view for explaining the normalization process in step S308.

If it is determined in the checking process in step S307 that the feature coordinates are appropriate, the flow advances to step S308, and the feature extraction unit 23 normalizes the size of the input image. As a normalization method, a known normalization scheme may be used. In this embodiment, as shown in FIG. 6, an inner-canthus distance 60 is obtained based on the inner canthus positions of the two eyes extracted in step S306, and affine transformation is applied to set this distance 60 to be identical to all the input images. FIG. 6 is a view for explaining the normalization process in step S308.

At the same time, a slope 61 of a line that connects the inner canthi is detected, and affine transformation correction that considers rotation is applied to cope with rotational variation. Note that the normalization process in step S308 is not indispensable.

In step S309, the feature extraction unit 23 acquires the output distributions that reflect the shape information and spatial layout information of the object. As a method of acquiring the output distributions, a correlation value distribution of a known template matching technique or the like may be used as the shape information, and Euclidean distances between feature points may be directly calculated as the spatial layout information. In this embodiment, the detection output distribution of one feature in the first level shown in FIG. 4 is used to extract the shape information. The reason why one feature of the first level is used as the detection output distribution is as follows.

The detection modules of the first level have learned to extract desired features in the second level using the BP (Back Propagation) method (see M. Matsugu, K. Mori, et. al, "Convolutional Spiking Neural Network Model for Robust Face Detection", 2002, International Conference On Neural Information Processing (ICONIP02). Therefore, features extracted by the detection modules of the first level cannot be uniquely specified, but the detection results of the first level may have detection levels nearly equal to the edge extraction process of local features such as the eyes, nose, mouth, and outline of the face upon taking their general view. Of these modules, the detection output distribution of the eighth feature detection module makes edge extraction to the details of respective local features and faithfully reflects their shapes. Hence, this detection output distribution is used as information used to extract shape information in the subsequent process. This is the reason why one feature of the first level is used to extract the shape information.

Since the detection output distributions (500, 501, and 502) of three features, i.e., the right-open V-shaped edge feature, left-open V-shaped edge feature and line segment edge 1 feature of the second level detect ends (end points, end sides) of local features, i.e., the inner canthus, outer canthus, eyelids, and two end points of the mouth, they express the relative positional relationship of the local features of at least the eyes and mouth. Hence, these detection output distributions are used as information used to extract the spatial layout information in the subsequent process. In this manner, the spatial layout information is not explicitly given as the distance space such as an Euclidean distance between respective features.

As described above, the detection results of the first level are used as information for obtaining the shape information of the local features such as the eyes, nose, mouth, and outline of the face, and the detection results of the second level are used as information for obtaining the spatial layout information indicating the relative positional relationship of the local features such as the eyes and mouth.

Referring back to FIG. 3, in step S310 the local region setting unit 24 applies affine transformation to the coordinates of the features in the input image extracted in step S306 to set regions (local regions) that include the features. For example, a rectangle which has the coordinates of each feature in the input image extracted in step S306 as the center is set as a local region.

The local region has an arbitrary shape such as a square, rectangle, or the like. The size of the local region can be arbitrarily set, but has an important meaning. Although it depends on the size of an object to be recognized, when personal recognition is made from a real environment image as in this embodiment, if a local region having a large size is set, it is inappropriate since such local region is influenced by noise such as environmental variations. On the other hand, if a local region having a small size is set, it becomes uncertain whether or not such region has information required to identify an object. In this embodiment, a local region for shape information extraction has a square shape having a size of 7 pixels (vertical) by 7 pixels (horizontal), and the sizes of a local region for spatial layout information extraction are 33 pixels (vertical) by 63 pixels (horizontal) and 30 pixels (vertical) by 23 pixels (horizontal). These region sizes are merely examples, and they may be appropriately determined in consideration of the influences depending on the local region sizes. Details of the local regions set in this embodiment will be described below using FIGS. 7A to 7C.

Figure 7A:
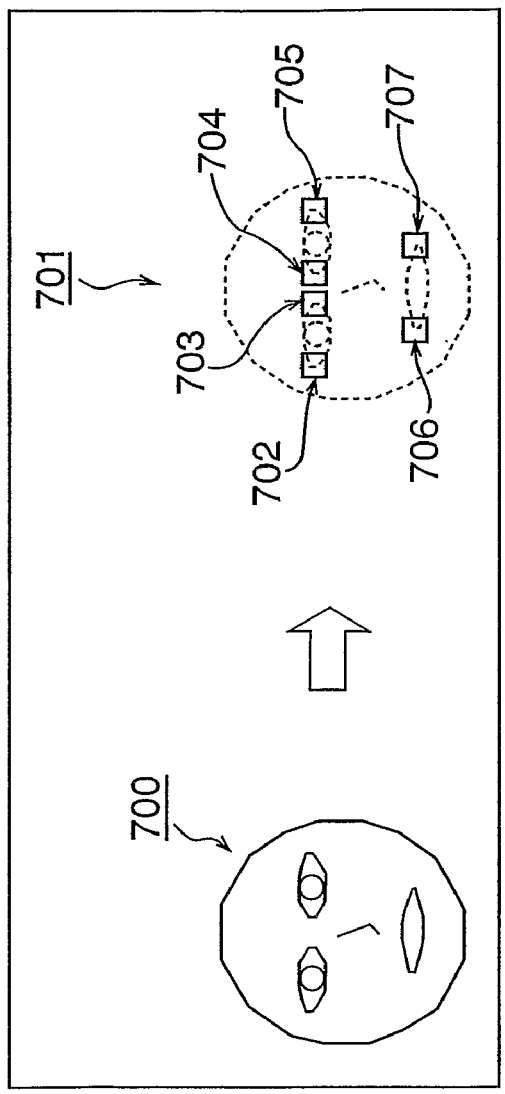
FIGS. 7A-7C are views for explaining settings of local regions.
Figure 7C:
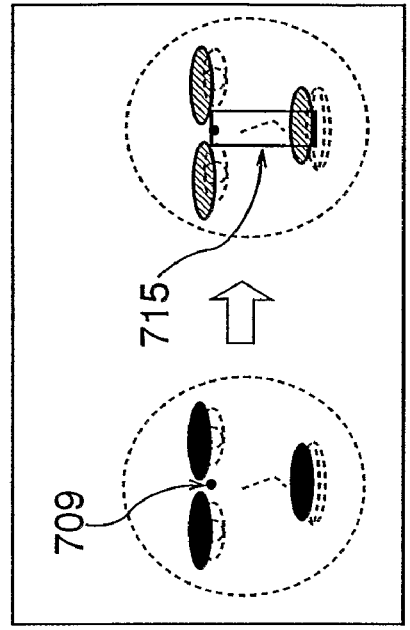
Figure 7B:
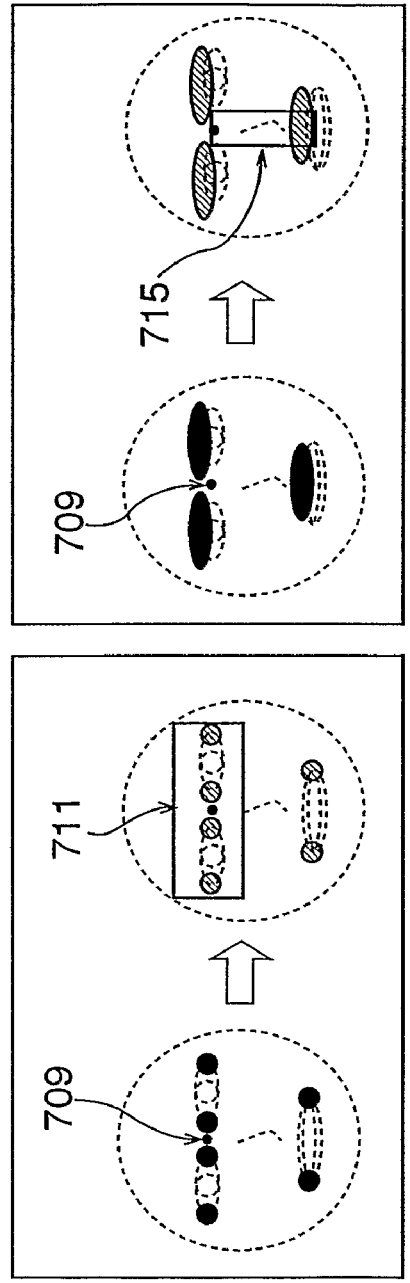

As shown in FIG. 7A, a detection output distribution 700 of the eighth feature detection module of the first level is used as information for shape information extraction, and local regions 702 to 707 are set for regions 701 such as the inner and outer canthi and the two ends of the mouth, as shown in FIG. 7B. The regions of the face for which the local regions are to be set are not limited to those, and local regions may be set for nostrils, wings of a nose, upper and lower lips that show personal differences.

On the other hand, local regions 711 and 715 are set for a right-left V-shaped edge detection output distribution indicated by black dots in FIG. 7B (the right-left V-shaped edge detection output distribution is acquired by adding the two V-shaped edge detection output distributions), and the line segment edge 1 detection output distribution, as shown in FIGS. 7B and 7C, for the purpose of extracting a degree of separation between the two ends of the eyes or the layout relationship of the eyes and mouth when the inner canthus distance is normalized. Likewise, local regions may be set for other feature regions upon extracting other features.

That is, in order to obtain the local region 711, an inner-canthus middle point 709 is calculated first. The inner-canthus middle point 709 is obtained by calculating the middle point of the right and left inner canthus positions calculated in step S306. To have this inner-canthus middle point 709 as the center, a region which includes the right and left inner and outer canthus positions is calculated as the local region 711 used to acquire layout information such as the degree of separation of the eyes.

On the other hand, in order to obtain the local region 715, a region which includes the inner-canthus middle point 709 and the line segment edge 1 detection output distribution is calculated as the local region 715 used to acquire eye-mouth layout information. Since the inner-canthus middle point 709 indicates the spatial layout of the eyes and the line segment edge 1 feature indicates that of the mouth, the detection output distribution within the local region 715 indicates the degree of separation between the eyes and mouth, i.e., the spatial layout information. As described above, the local regions are set. The shape information and spatial layout information are acquired from the detection output distributions in the local regions.

Referring back to FIG. 3, in step S311 the feature vector generation unit 25 generates feature vectors including the shape information and/or spatial layout information from the local regions set in step S310. As described above, in this embodiment, the shape information uses the detection output distribution of the eighth feature detection module of the first level, and the spatial layout information uses the detection output distributions of three features, i.e., the right-open V-shaped edge feature, left-open V-shaped edge feature and line segment edge 1 feature of the second level.

Figure 8A:
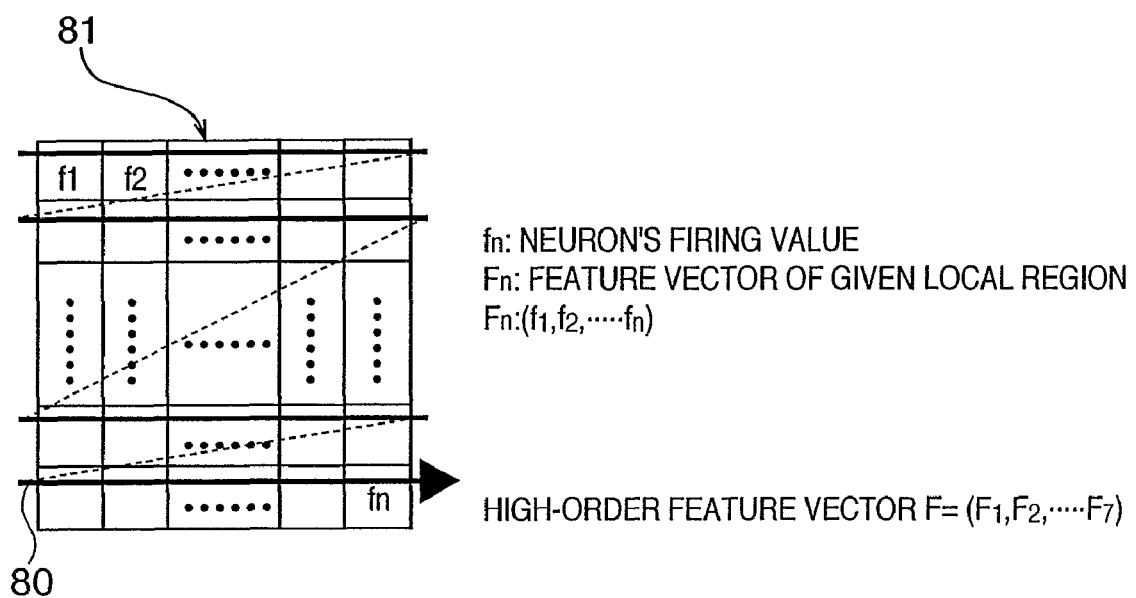
FIG. 8A is a view showing an example of the configuration of feature vectors.

The correlation value distributions of template matching or the like may be used as the detection output distributions. However, since this embodiment uses the detection output distributions of the neural network, neuron's firing values f corresponding to pixels in the local regions are used. Note that the firing value f falls within the range $0 \leq f \leq 1$. Therefore, the feature vectors are calculated as vectors having neuron's firing values corresponding to pixels in the local regions. FIG. 8A shows an example of configuration of feature vectors. In this embodiment, each feature vector is generated to include the shape information and spatial layout information. In this way, the feature vector generation unit 25 generates feature vectors for respective local regions.

Upon generating the feature vectors, a rectangular region may be segmented for respective features included in that rectangular region, and feature vectors may be generated for the segmented regions.

Referring back to FIG. 3, in step S312 the object recognition unit 26 inputs the feature vectors calculated in step S311 to a given model function which is prepared in advance to identify the object. As a data comparison method, classification may be made using a model function generated by the neural network or a known pattern recognition technique such as the nearest neighbor determination rule or the like. In this embodiment, an SVM (Support Vector Machine) learning algorithm is used to generate a model function using the feature vectors of a registrant to be identified and persons other than the registrant. The reason why SVM is used is that high-speed learning can be made, generalization performance is high, and the SVM is theoretically backed up. Generation of a model function by the SVM learning algorithm and the flow of classification of input data used in this embodiment will be described below.

The SVM learning algorithm is disclosed on the Internet. The SVM learning algorithm of this embodiment uses libsvm-2.5 disclosed at "http://www.csie.ntu.edu.tw/~cjlin/libsvm" at the time of application of this specification. The libsvm has various clustering types and kernel functions. This embodiment uses a clustering type called C-SVC using a cost variable, and a linear function as the kernel function. For details, please refer to the homepage specified by the above URL.

The flow of generation of a model function will be explained first. This embodiment requires image data of registrants and those of persons other than the registrants. Next, by the same processing flow as steps S300 to S311 in FIG. 3, feature vectors around desired features (features of the inner and outer canthi of the two eyes and the two ends of the mouth in this embodiment) are extracted from each individual image data. Then, a learning data file that specifies these feature vectors and their property (information indicating whose feature vectors they are) is generated, and learning, i.e., generation of a model function is done by the SVM learning algorithm that designates the clustering type and kernel function.

Details of processing for classifying inputs using the generated model function will be described below. The model function has a format with a plurality of two-class classifying functions. For example, assume that there are four registrants, they are respectively A class, B class, C class, and D class, and a class other than the registrants is E class. At this time, the two-class classifying function is a function which determines which of A and B is likely to be an input using a threshold value (the threshold value is generated for two classes upon generating the model function). Hence, the input feature vectors undergo two-class classification between all classes, i.e., A or B, A or C, A or D, A or E, B or C, . . . , and a final class is determined by a majority decision process.

With this process, a person can be identified from an image including an arbitrary object.

Second Embodiment

In the first embodiment, the shape information of each local feature is extracted from the detection output distribution of one feature of the first level. However, in this embodiment, the shape information is also extracted from the second level. Hence, the processing flow of this embodiment is substantially the same as that in the first embodiment, except for different local regions used to generate feature vectors.

Figure 8B:
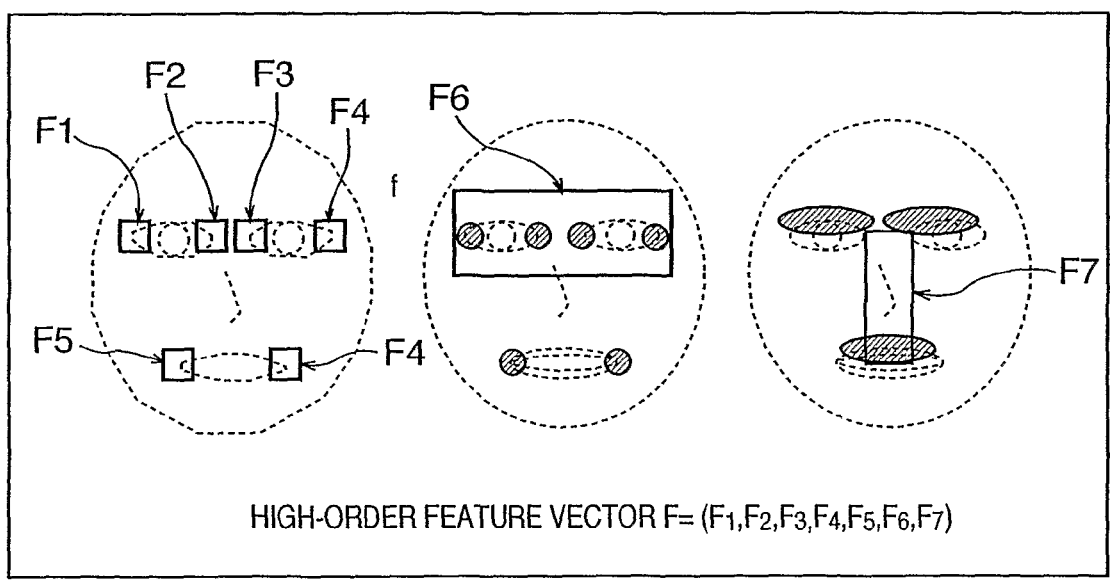
FIG. 8B shows local regions according to the second embodiment of the present invention.
Figure 9:
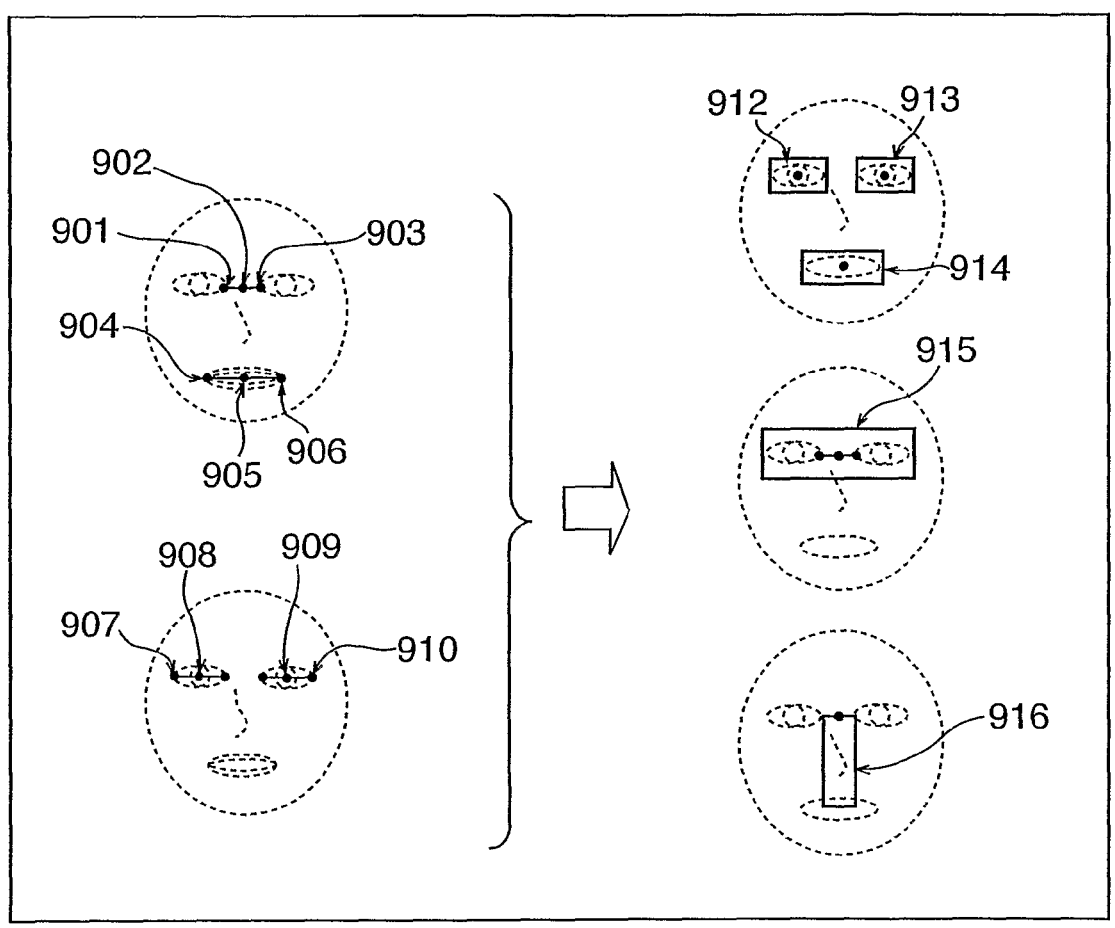
FIG. 9 shows the relationship between features and local regions.

FIG. 8B shows local regions according to this embodiment. FIG. 9 shows the relationship between features and local regions. As shown in FIG. 9, an inner canthus middle point 902, mouth middle point 905, left-eye middle point 908, and right-eye middle point 909 as a middle point group are calculated from a left-eye outer canthus feature 907, left-eye inner canthus feature 901, right-eye inner canthus feature 903, right-eye outer canthus feature 910, mouth left-end feature 904, mouth right-end feature 906 as a feature group extracted by feature extraction in step S306. Next, local regions 912 to 916 are set with reference to these middle points. More specifically, the left-eye local region 912 and right-eye local region 913, each of which has the size of a single eye as a range, the mouth local region 914 which has the mouth as a range, the inner canthus local region 915 for an inner canthus range, and the eye-mouth local region 916 for an eye-mouth range are set. The practical setting purpose of these local regions is as follows.

Feature amounts expressed by the detection output distributions used upon extracting feature vectors are important. This embodiment uses the detection output distributions of the second level shown in FIG. 4.

Figure 10:
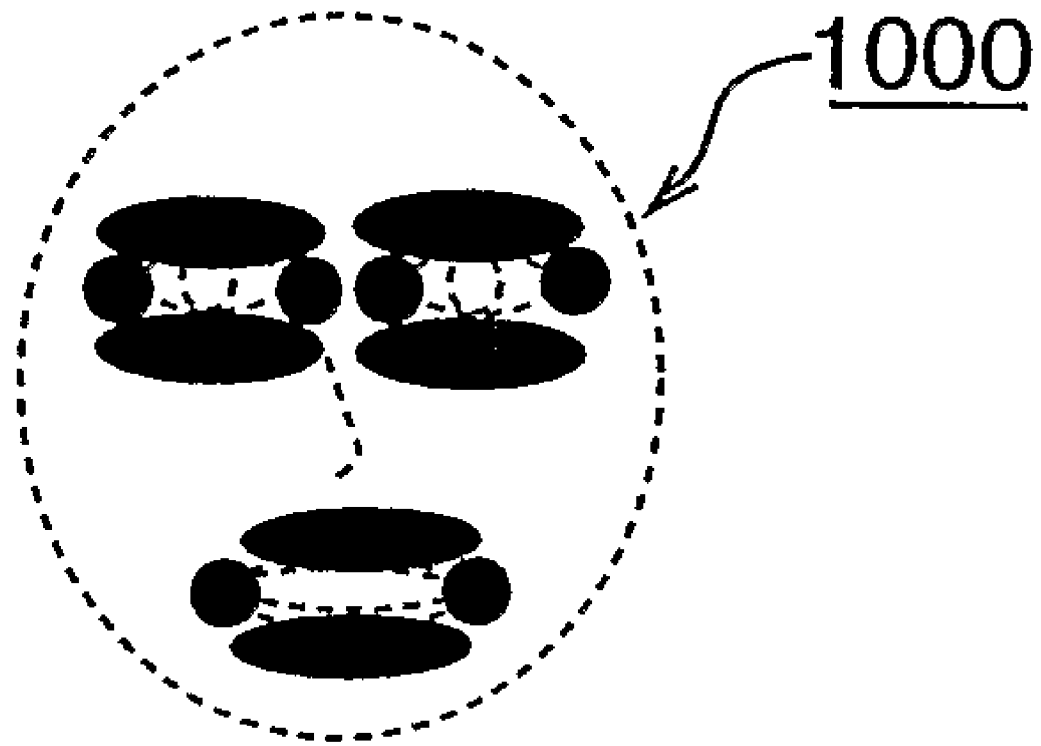
FIG. 10 shows a distribution generated by superposing all the detection output distributions of respective detection modules of the second level.
Figure 11:
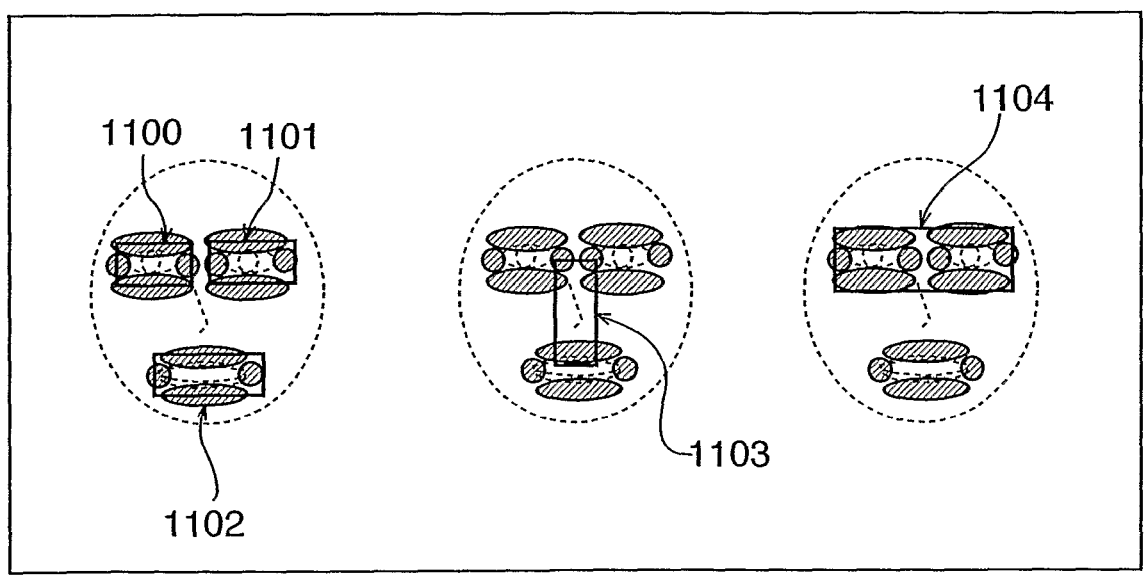
FIG. 11 shows local regions that include respective distributions shown in FIG. 10.

The feature amounts extracted in the second level include the right-open V-shaped edge in FIG. 5B, left-open V-shaped edge 501 in FIG. 5C, line segment edge 1 in FIG. 5D, and line segment edge 2 in FIG. 5E. The local regions (912 to 916) are set for a "distribution formed by superposing all the detection output distributions of the detection modules of the second level" indicated by black regions in FIG. 10. FIG. 11 shows respective local regions. The setting purpose of the local regions will be described below using FIG. 11. Since the detection distributions in left-eye, right-eye, and mouth local regions 1100, 1101, and 1102 indicate those of the right- and left-open V-shaped edge features, i.e., the end point features of the eyes and mouth, and those of the line segment edge features, i.e., the upper and lower eyelid features and the upper and lower lip features, the shape information of each of the eyes and mouth can be extracted. Hence, features with quality equivalent to that of the shape information of the first embodiment can be extracted. Furthermore, as in the first embodiment, spatial layout information of the eyes and mouth is extracted from an eye-mouth local region 1103, and that of the degree of separation of the eyes is extracted from an eye local region 1104. The purpose of setting the local regions, as shown in FIG. 9 has been explained.

Finally, the output distributions are extracted from the local regions, and high-order feature vectors including the shape information and spatial layout information are generated and are input to the model function to identify an object, as in the first embodiment.

Third Embodiment

The basic processing flow is the same as that in the first embodiment. However, this embodiment adopts the detection output distributions based on a neural network shown in FIG. 12 as those for feature vector generation.

Figure 12:
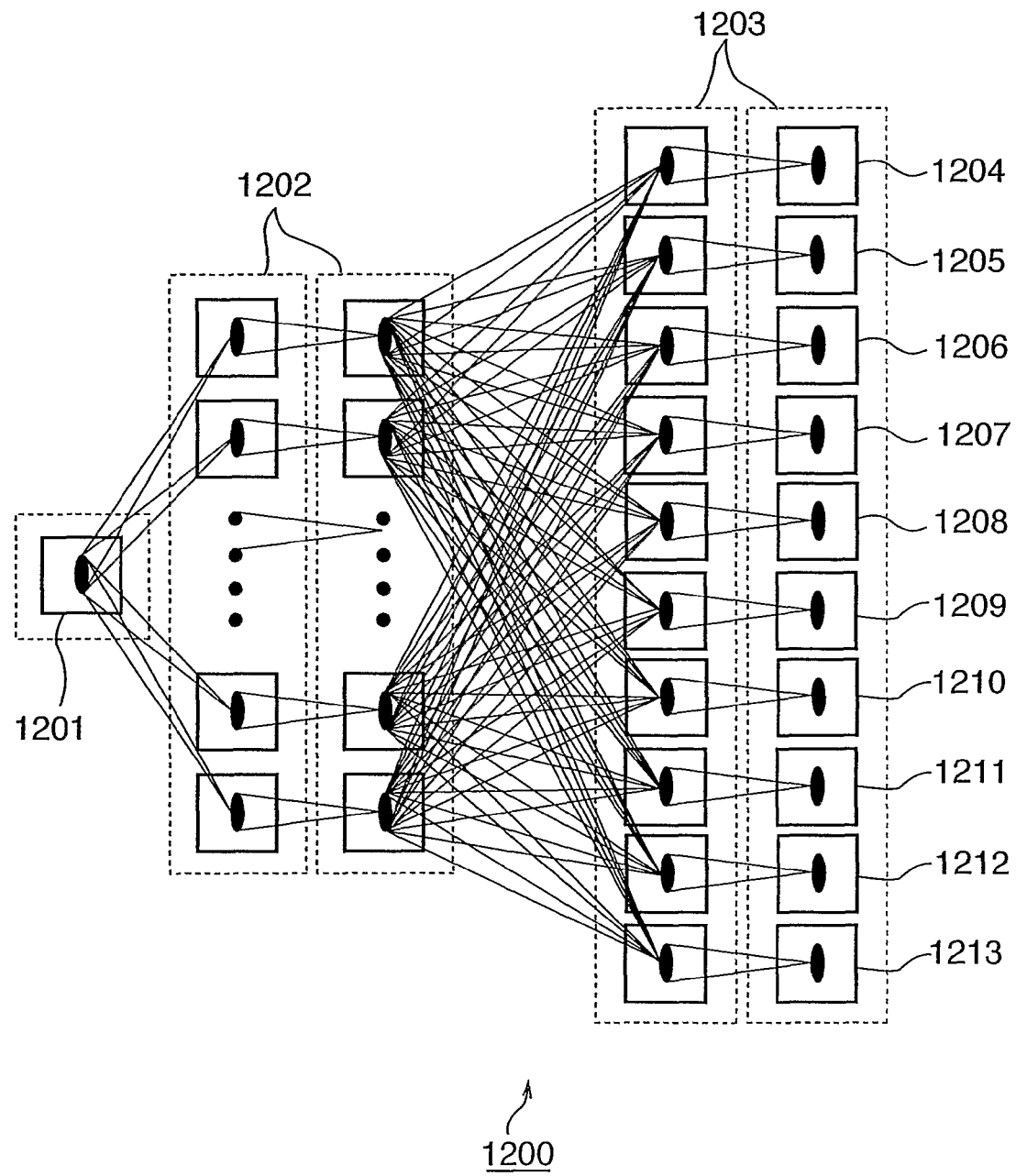
FIG. 12 is a view showing the configuration of a neural network according to the third embodiment of the present invention.

FIG. 12 shows the configuration of a neural network according to this embodiment. The configuration of the neural network for feature extraction is as shown in FIG. 12. Unlike in the neural network used in the first and second embodiments, upper and lower eyelid detection modules 1210 and 1211, and upper and lower lip detection modules 1212 and 1213 are added.

In a neural network 1200 for feature extraction used in this embodiment, upon reception of feature detection results of a first level 1202 from an input image 1201 as in the first embodiment, a left-eye inner canthus detection module 1204, a left-eye outer canthus detection module 1205, a right-eye inner canthus detection module 1206, a right-eye outer canthus detection module 1207, a left mouth end point detection module 1208, a right mouth end point detection module 1209, the upper eyelid detection module 1210, the lower eyelid detection module 1211, the upper lip detection module 1212, and the lower lip detection module 1213 in a second level 1203 detect respective features.

The respective detection modules are configured in advance to learn and detect various local feature images mainly including respective local features (right and left inner canthi, right and left outer canthi, right and left mouth end points, upper and lower eyelids, and upper and lower lips). Finally, the neural network of FIG. 12 is used as a feature extraction unit and a module for generating feature vectors from the feature detection output distributions of the feature extraction unit. Therefore, since the neural network has the detection modules that have learned various variations for respective features, they can extract features with higher precision than the first embodiment, which outputs the right-left V-shaped feature detection output distribution and line segment feature detection output distribution as the extraction results of the features (right and left inner canthi, right and left outer canthi, right and left mouth end points, upper and lower eyelids, and upper and lower lips). Hence, the detection output distribution itself sufficiently reflects the characteristics of each local feature.

As for the local region setting for feature vector generation, the same style as that in FIG. 9 can be adopted. Since the features and middle point groups can be obtained from the results of the feature extraction neural network as in the second embodiment, local regions are set on the basis of their coordinates as in the first embodiment. The detection output distributions of the feature detection modules are summed up, and local regions are also set for that sum total output distribution, thus extracting detection output distributions. High-order feature vectors each including the shape information and layout information are generated based on the detection output distributions, and are input to the model function as in the first and second embodiments, thereby identifying an object.

Fourth Embodiment

The image processing apparatus according to each of the first to third embodiment has been explained as an image sensing apparatus. That is, this apparatus has been explained as an apparatus that identifies a face in an image input by image sensing. In this embodiment, this image processing apparatus is applied to a computer such as a PC (personal computer), WS (workstation), or the like. That is, in the first to third embodiments, an image is input to the apparatus by image sensing. However, in this embodiment, an image is acquired by loading it from an external storage device such as a hard disk drive or the like onto a RAM in this apparatus, or externally receiving it by this apparatus via an I/F. A CPU of this apparatus executes the identification process for this image.

Figure 1:
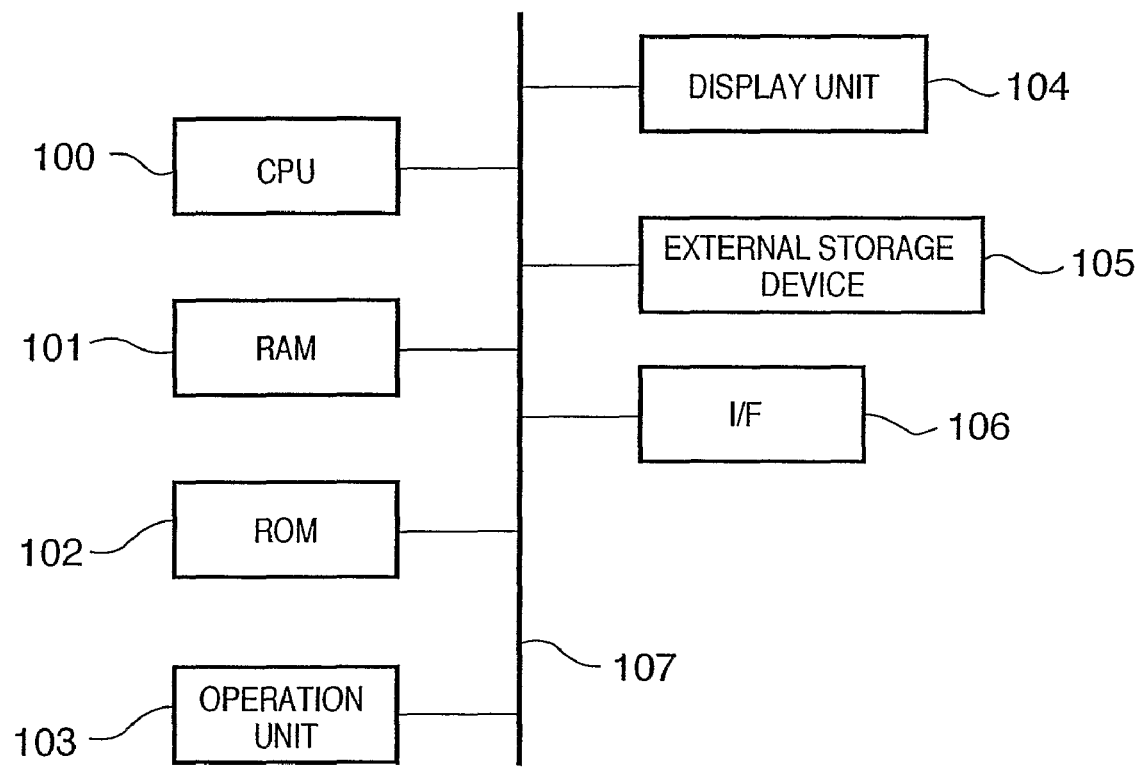
FIG. 1 is a block diagram showing the basic arrangement of an image processing apparatus according to the fourth embodiment of the present invention.

FIG. 1 is a block diagram showing the basic arrangement of the image processing apparatus according to this embodiment.

Reference numeral 100 denotes a CPU which controls the overall apparatus and executes respective processes to be described later using programs and data stores in a RAM 101 and ROM 102.

Reference numeral 101 denotes a RAM which comprises a work area required when the CPU 100 executes various processes, and also an area for temporarily storing programs and data loaded from an external storage device 105.

Reference numeral 102 denotes a ROM which stores a boot program, setting data of this apparatus, and the like.

Reference numeral 103 denotes an operation unit which comprises a keyboard and a pointing device such as a mouse or the like, and can input various instructions from the user to the CPU 100.

Reference numeral 104 denotes a display device which comprises a CRT, liquid crystal display, or the like, and can display the processing result of the CPU 100 by means of text, images, and the like.

Reference numeral 105 denotes an external storage device which comprises a large-capacity information storage device such as a hard disk drive or the like. The external storage device 105 saves an OS (operating system), and programs and data that make the CPU 100 to implement the functions of the units shown in FIG. 2. Some or all of these programs and data are loaded onto the RAM 101 under the control of the CPU 100. Also, the external storage device 105 saves image data including an object to be identified, model function data, and the like, which are loaded onto the RAM 101 under the control of the CPU 100, as needed.

Reference numeral 106 denotes an I/F. Data communications with external apparatuses are made via this I/F 106. For example, image data including an object to be identified can be downloaded from a digital camera or another computer connected to the I/F 106. Note that the downloaded image data is output to the RAM 101, and is temporarily stored there as an object to be processed by the CPU 100.

Reference numeral 107 denotes a bus which interconnects the aforementioned units.

The individual identification processing of an object according to each of the above embodiments provides the following effects.

Taking personal recognition as an example, since the aforementioned identification processing is based on local regions for some of features in place of all features (e.g., eyes, mouth, and nose), it is not so seriously influenced by illumination variations and rotation variations of image data. Since the spatial layout of a face or that of face features is acquired by the face detection and feature extraction processes, and local regions are set based on such information, the identification processing is free from any influence of spatial layout variations.

Therefore, the identification processing according to each of the above embodiments has a great advantage over the eigenface method whose prediction depends on the illumination variations and spatial layout variations described in the background of the invention. Furthermore, since the identification processing according to each of the above embodiments uses the detection output distributions as the intermediate output results of the neural network as feature vector generation means, it can be installed as a part of the face detection processing, and a compact system can be realized. Therefore, the identification processing according to each of the above embodiments has an advantage over the Dynamic link architecture described in the background of the invention in terms of processing cost.

Other Embodiments

The objects of the present invention are also achieved when a CPU or MPU of a camera reads out and executes a program code from a recording medium (or storage medium), which records a program code of a software program that can implement the functions of the above-mentioned embodiments. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the camera, but also by some or all of actual processing operations executed by an operating system (OS) running on the camera on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the camera, after the program code read out from the recording medium is written in a memory of the extension card or unit.

When the present invention is applied to the recording medium, that recording medium stores program codes corresponding to the aforementioned flowchart (functional arrangement).

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-190306 filed on Jun. 28, 2004, the entire contents of which are hereby incorporated by reference herein.

The invention claimed is:

1. An image processing method for executing a process for identifying an object included in an image, comprising:
a detection step of detecting features in an object of interest included in the image;
a setting step of setting local regions which include feature groups required to obtain a shape and positional relationship of the object, of the features detected in the detection step; and
a determining step of determining which of different individuals the object of interest is, on the basis of the feature groups in the local regions set in the setting step for the object of interest.

2. The method according to claim 1, wherein the determining step includes a step of determining which of different individuals the object of interest is determined, using feature vector data in the local regions set in the setting step for the object of interest as input values of a model function based on feature vector data in the local regions obtained by executing processes in the detection step and the setting step for respective different individuals in advance.

3. The method according to claim 1, wherein the detection step includes a step of extracting features in the object of interest included in the image using a hierarchical neural network used to detect features of an object included in the image.

4. The method according to claim 3, wherein the feature group required to obtain the shape is obtained based on an output distribution of a neuron group used to detect edges of local features of the object in the hierarchical neural network.

5. The method according to claim 3, wherein the feature group required to obtain the positional relationship is obtained based on an output distribution of a neuron group used to detect end portions of local features of the object in the hierarchical neural network.

6. The method according to claim 1, wherein the determining step includes a step of determining which of different individuals the object of interest is, using feature vector data in the local regions set in the setting step for the object of interest as input values of a model function generated using feature vectors of the object to be identified and individuals other than the object using an SVM (Support Vector Machine) learning algorithm.

7. The method according to claim 1, further comprising a check step of checking if the positional relationship of predetermined features detected in the detection step is appropriate.

8. The method according to claim 1, further comprising a normalization step of normalizing a size and slope of the image on the basis of positional relationship of predetermined features detected in the detection step.

9. A non-transitory computer-readable storage medium storing a program for making a computer execute an image processing method of claim 1.

10. An image processing apparatus for executing a process for identifying an object included in an image, comprising:
detection means for detecting features in an object of interest included in the image;
setting means for setting local regions which include feature groups required to obtain a shape and positional relationship of the object, of the features detected by said detection means; and
determining means for determining which of different individuals the object of interest is, on the basis of the feature groups in the local regions set by said setting means for the object of interest.

* * * * *